United States Patent
Kuwamura

(10) Patent No.: US 7,064,896 B2
(45) Date of Patent: Jun. 20, 2006

(54) METHOD FOR PRODUCING POLARIZING PLATE, POLARIZING PLATE AND IMAGE DISPLAY DEVICE USING THE SAME

(75) Inventor: Makoto Kuwamura, Ibaraki (JP)

(73) Assignee: Nitto Denko Corporation, Ibaraki (JP)

( * ) Notice: Subject to any disclaimer, the term of this patent is extended or adjusted under 35 U.S.C. 154(b) by 5 days.

(21) Appl. No.: 10/726,526

(22) Filed: Dec. 4, 2003

(65) Prior Publication Data

US 2004/0119178 A1 Jun. 24, 2004

(30) Foreign Application Priority Data

Dec. 5, 2002 (JP) .................. P2002-353560

(51) Int. Cl.
*G02B 5/30* (2006.01)

(52) U.S. Cl. .................. 359/485; 156/160; 264/1.31; 264/1.7

(58) Field of Classification Search .................. 349/96
See application file for complete search history.

(56) References Cited

U.S. PATENT DOCUMENTS

| | | | |
|---|---|---|---|
| 3,806,400 A * | 4/1974 | Laethem .................. 52/223.1 |
| 4,292,370 A * | 9/1981 | Pekko .................. 428/355 N |
| 5,783,299 A * | 7/1998 | Miyashita et al. .......... 428/329 |
| 6,066,218 A * | 5/2000 | Kuhn et al. .................. 156/87 |
| 6,331,882 B1 * | 12/2001 | Shimodaira et al. ........ 349/122 |
| 2002/0145801 A1 * | 10/2002 | Tsuchimoto et al. ........ 359/485 |
| 2003/0169497 A1 * | 9/2003 | Ito et al. .................. 359/485 |
| 2003/0230379 A1 * | 12/2003 | Roubik .................. 156/229 |

FOREIGN PATENT DOCUMENTS

| | | | | |
|---|---|---|---|---|
| JP | 54-133150 A | * | 10/1979 | |
| JP | 61-070504 A | * | 4/1986 | .................. 349/96 |
| JP | 64-070504 A | * | 4/1986 | |
| JP | 09-090344 A | * | 4/1997 | |
| JP | 2001-108830 A | * | 4/2001 | |
| JP | 2002-258049 | | 9/2002 | |

OTHER PUBLICATIONS

PTO-2005-3069 "Adhesion Method of Beam Deviation Film in the Liquid Crystal Cell", English-language translation of JP 54-133150 A, Schreiber Translations, Inc., United States Patent and Trademark Office, Washington, DC, Apr. 2005.*

* cited by examiner

*Primary Examiner*—Drew A. Dunn
*Assistant Examiner*—Lee Fineman
(74) *Attorney, Agent, or Firm*—Westerman, Hattori Daniels & Adrian LLP

(57) ABSTRACT

A method of producing a polarizing plate, including the step of laminating a pair of curled protective sheets onto opposite surfaces of a polarizer respectively so that respective curling directions of the pair of curled protective sheets are reverse to each other, wherein the laminating index of the pair of protective sheets is selected to be not higher than 60 in order to restrain the polarizing plate from being curled.

16 Claims, 2 Drawing Sheets

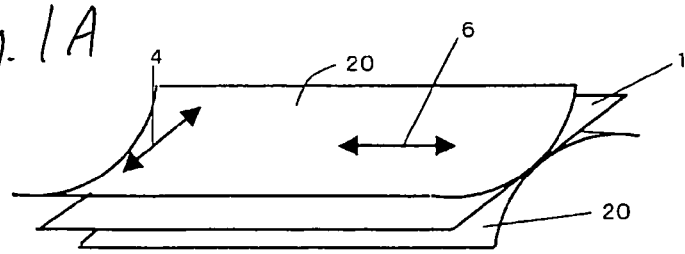 Fig. 1A 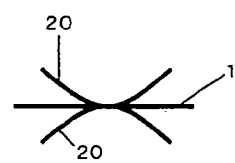
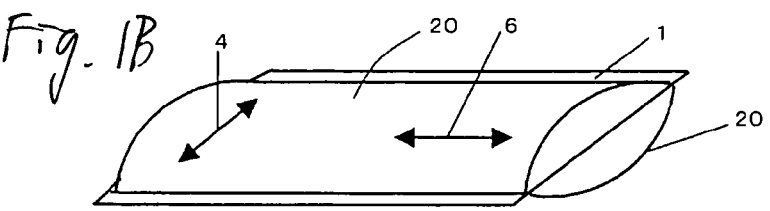 Fig. 1B 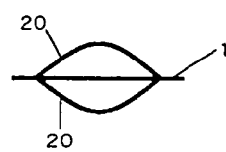
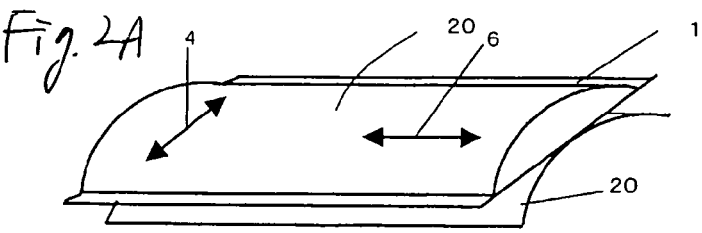 Fig. 2A 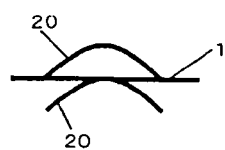
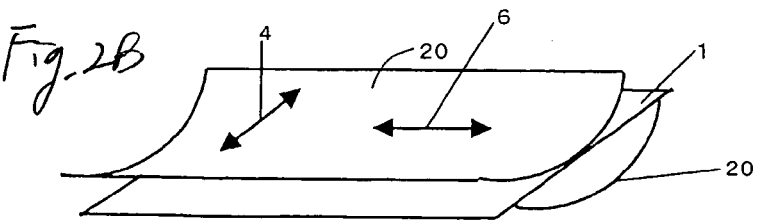 Fig. 2B 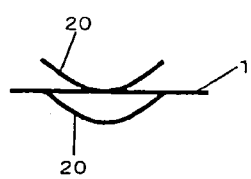

METHOD FOR PRODUCING POLARIZING PLATE, POLARIZING PLATE AND IMAGE DISPLAY DEVICE USING THE SAME

The present application is based on Japanese Patent Application No. 2002-353560, which is incorporated herein by reference.

BACKGROUND OF THE INVENTION

1. Field of the Invention

The present invention relates to a polarizing plate used in an image display device such as a liquid crystal display device, an organic EL display device or a PDP and particularly to a polarizing plate used in a liquid crystal display device.

2. Description of the Related Art

A polarizing plate used in an image display device (especially, a liquid crystal display device) is produced as follows. For example, after a polyvinyl alcohol (PVA) film is subjected to a dyeing process, a crosslinking process and a stretching process, the film is dried and laminated between protective layers each made of a transparent protective film such as a triacetyl cellulose (TAC) film. In the dyeing process, the polyvinyl alcohol (PVA) film is dyed with dichroic iodine or dichroic dye. In the crosslinking process, the film is crosslinked with boric acid, borax or the like. In the stretching process, the film is stretched uniaxially. (The dyeing, crosslinking and stretching processes need not be executed separately. Some processes may be executed simultaneously. The sequence of the processes is not particularly limited.)

Incidentally, it is preferable that a protective sheet not curled originally is used as each of the protective layers used for protecting the polarizing plate. When a film made of a material such as triacetyl cellulose (TAC) or polycarbonate is used as the protective sheet, generally, the film is however more or less curled because the film is produced by stretching. If the polarizing plate is curled largely, a portion different in optical characteristic such as in-plane light transmittance is produced by stress acting on the polarizing plate when the polarizing plate is bonded to a panel and used. This causes ununiformity of image display. If the polarizing plate is bonded to a liquid crystal cell in the condition that an adhesive surface of the polarizing plate to be bonded to the liquid crystal cell is curled concavely with respect to the liquid crystal cell, voids are held between the polarizing plate and the liquid crystal cell bonded to each other. For this reason, it is impossible to use the polarizing plate.

The aforementioned curl was heretofore suppressed by a method of adjusting the physical condition of the protective sheet (e.g., see Patent Document 1). In recent years, there was however a demand for a bigger size of the polarizing plate than ever. As the area of the polarizing plate increased, the amount of curl at edge sides increased inevitably. With the increase in the amount of curl in the polarizing plate, there arose again the case where the curl of the polarizing plate brought about the problem of lowering of work efficiency and in-plane variation in various kinds of optical characteristic because of the difficulty of bonding the polarizing plate to the panel. Therefore, an important issue is to suppress the curl of the polarizing plate more sufficiently.

[Patent Document 1]

Unexamined Japanese Patent Publication No. 2002-258049

SUMMARY OF THE INVENTION

An object of the invention is to provide a method for producing a polarizing plate in which curl of the polarizing plate can be reduced, mainly a method for producing a polarizing plate in which curl of a widthwise direction generated in a polarizing plate production process, i.e., curl of the widthwise direction of a raw material sheet of the polarizing plate can be reduced, a polarizing plate produced by the production method, and an image display device using the polarizing plate.

The inventors have made investigation earnestly to examine the problem. As a result, it has been found that the foregoing object can be achieved by the following method of producing a polarizing plate. Thus, the invention is accomplished.

The invention provides a method of producing a polarizing plate, comprising including the step of laminating a pair of curled protective sheets onto opposite surfaces of a polarizer respectively so that respective curling directions of the pair of curled protective sheets are reverse to each other.

Preferably, the pair of curled protective sheets have a laminating index L of not higher than 60 when the laminating index L is given by the expression:

$$L=(a-b)/a \times 100$$

in which a and b are quantities of curl in the pair of protective sheets respectively on the assumption of a>b.

The invention also provides a polarizing plate produced by the production method on the basis of the laminating index L. The invention further provides a composite polarizing plate produced in the same manner as described above and having an optical layer laminated on the polarizing plate. The invention further provides an image display device using at least one of these polarizing plates.

The invention further provides a polarizing plate including a polarizer, and a pair of protective sheets laminated onto opposite surfaces of the polarizer respectively, wherein curling directions of the pair of protective sheets are reverse to each other when the pair of protective sheets are separated from the polarizing plate.

BRIEF DESCRIPTION OF THE DRAWINGS

In the accompanying drawings:

FIGS. 1A and 1B are combinations of a schematic view and a sectional view showing curling directions in the case where protective sheets are laminated on opposite surfaces of a polarizer in the invention;

FIGS. 2A and 2B are combinations of a schematic view and a sectional view showing curling directions in the case where protective sheets are laminated on opposite surfaces of a polarizer in a comparative example;

DETAILED DESCRIPTION OF THE PREFERRED EMBODIMENTS

Figure 3:
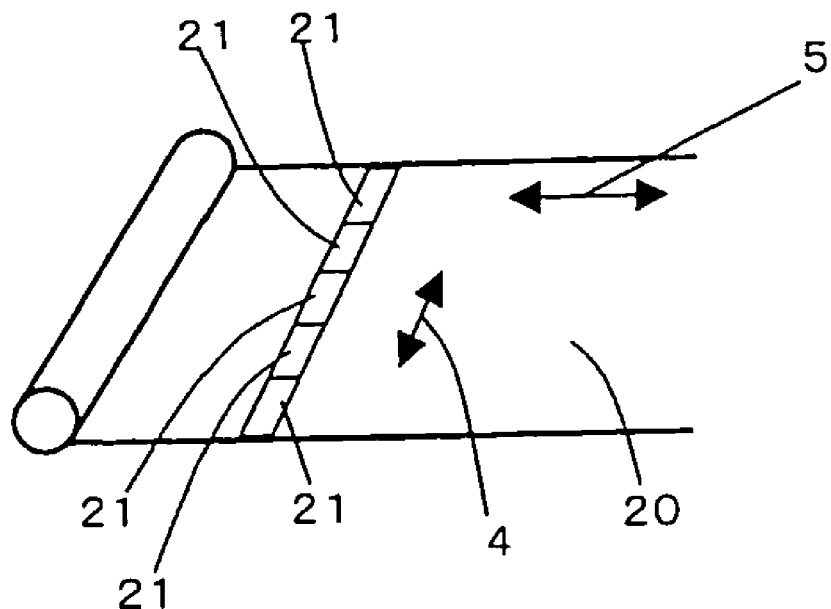
FIG. 3 is a schematic view showing a method for acquiring a curl amount measuring sample from a protective sheet in the invention.

A polarizing plate according to the invention is basically configured so that a protective sheet is bonded, through a suitable adhesive layer made of a vinyl alcohol polymer etc., to one or each of opposite surfaces of a polarizer, for example, made of a dichroic substance-containing polyvinyl alcohol film.

The polarizer is produced by a swelling process, a dyeing process, a crosslinking process, a stretching process, etc. In the swelling process, for example, a polyvinyl alcohol film is immersed in water, and washed with water so that dirt or an antiblocking agent deposited on a surface of the polyvinyl alcohol film can be cleaned. In addition, the polyvinyl alcohol film is swollen so as to be effective in preventing ununiformity such as ununiform dyeing. In the dyeing process, the film is dyed in a bath containing a dichroic substance such as iodine or a dye such as a dichroic dye. In the crosslinking process, the film is crosslinked in a bath containing a crosslinking agent such as boric acid or borax. In the stretching process, the film is stretched by a scaling factor of from three times to seven times as large as its original length. The sequence of these processes is not particularly limited. Some processes may be carried out simultaneously. For example, the film may be stretched after dyed with iodine, the film may be stretched while dyed with iodine, or the film may be dyed with iodine after stretched. The film can be stretched even in an aqueous solution of boric acid or potassium iodide or in a water bath.

Any kind of material can be used as the polarizer without any particular limitation. Examples of the material of the polarizer include: a hydrophilic high-molecular film, such as a polyvinyl alcohol film, a partially formalized polyvinyl alcohol film or a partially saponified ethylene-vinyl acetate copolymer film, which film is stretched uniaxially after adsorbing a dichroic substance such as iodine or dichroic dye; and a polyenic oriented film such as a dehydrated film of polyvinyl alcohol or a dehydrochlorinated film of polyvinyl chloride. Especially, a polarizer made of a combination of a polyvinyl alcohol film and a dichroic substance such as iodine is preferred. The thickness of the polarizer is not particularly limited. Generally, the thickness of the polarizer is selected to be in a range of from 5 µm to 80 µm.

The polarizer may contain boric acid, zinc sulfate, zinc chloride, etc. as occasion demands. The polarizer may be immersed in an aqueous solution of potassium iodide or the like.

A material excellent in transparency, mechanical strength, thermal stability, moisture sealability, isotropy and so on is preferably used as the material for forming the protective sheet provided on one or each of opposite surfaces of the polarizer. Examples of the polymer for forming the protective sheet include: polyester polymer such as polyethylene terephthalate, and polyethylene naphthalate; cellulose polymer such as diacetyl cellulose, and triacetyl cellulose; acrylic polymer such as polymethyl methacrylate; styrene polymer such as polystyrene, and acrylonitrile-styrene copolymer (AS resin); and polycarbonate polymer. Examples of the polymer for forming the protective sheet further include: polyolefin polymer such as polyethylene, polypropylene, polyolefin having a cyclo or norbornene structure, and ethylene-propylene copolymer; vinyl chloride polymer; amide polymer such as Nylon, and aromatic polyamide; imide polymer; sulfone polymer; polyether-sulfone polymer; polyether-ether-ketone polymer; polyphenylene sulfide polymer; vinyl alcohol polymer; vinylidene chloride polymer; vinyl butyral polymer; allylate polymer; polyoxymethylene polymer; epoxy polymer; and blends of these polymers. The protective sheet can be also formed as a cured layer of a heat-curable or ultraviolet-curable resin such as an acrylic resin, an urethane resin, an acrylic urethane resin, an epoxy resin, or a silicone resin. Among those polymers, cellulose polymer is particularly preferable.

A polymer film described in Unexamined Japanese Patent Publication No. 2001-343529 (WO 01/37007) may be also used as the protective sheet. For example, the polymer film is made of a resin composition containing (A) a thermoplastic resin having substitutional and/or nonsubstitutional imide group as a side chain, and (B) a thermoplastic resin having substitutional and/or nonsubstitutional phenyl group and nitrile group as a side chain. As a specific example, there can be used a film of a resin composition containing an alternating copolymer of isobutene and N-methyl maleimide, and an acrylonitrile-styrene copolymer. As the film, there can be used a film made of an extruded mixture product of a resin composition.

The thickness of the protective sheet is not particularly limited. Generally, the thickness of the protective sheet is selected to be not larger than 500 µ, preferably in a range of from 1 µm to 300 µm, especially preferably in a range of from 5 µm to 200 µm. From the point of view of polarizing characteristic, durability, etc., it is preferable that a surface of the protective film is saponified with alkali or the like.

It is also preferable that the protective sheet is as colorless as possible. Hence, there can be preferably used a transparent protective film which is formed so that a retardation in a direction of thickness of the film is in a range of from −90 nm to +75 nm when the retardation is given by the expression:

$$Rth=[(nx+ny)/2-nz]\cdot d$$

in which nx and ny are main refractive indices in planes of the film, nz is a refractive index in a direction of thickness of the film, and d is the thickness of the film.

When the transparent protective film which is formed so that the retardation (Rth) in the direction of thickness is in a range of from −90 nm to +75 nm is used, coloring (optical coloring) of the polarizing plate caused by the transparent protective film can be substantially eliminated. More preferably, the retardation (Rth) in the direction of thickness is selected to be in a range of from −80 nm to +60 nm, especially in a range of from −70 nm to +45 nm.

Two protective sheets different in characteristic may be bonded to opposite surfaces of the polarizer respectively. Examples of the characteristic include thickness, material, light transmittance, tensile modulus of elasticity, and presence of an optical layer. The characteristic is not limited to the examples.

In a production method according to the invention, two curled protective sheets as a sample extracted at a certain point of time before lamination are laminated onto opposite surfaces of a polarizer respectively so that curling directions of the protective sheets are reverse to each other as shown in FIG. 1A or 1B. It is found that if the protective sheets are laminated onto opposite surfaces of the polarizer respectively so that curling directions of the protective sheets are equal to each other as shown in FIG. 2A or 2B, the amount of curl of a polarizing plate after lamination becomes larger than that in the case where the protective sheets are laminated onto opposite surfaces of the polarizer respectively so that curling directions of the protective sheets are reverse to each other as shown in FIG. 1A or 1B.

FIG. 1A shows a lamination where convex curled surfaces (the curling direction is a direction coming closer to the polarizer) of two protective sheets are opposed to each other. FIG. 1B shows a lamination where concave curled surfaces (the curling direction is a direction moving away from the polarizer) of two protective sheets are opposed to each other.

The amount of curl of each protective sheet is measured as follows. As shown in FIG. 3, five samples 21 each having a size of 3 mm wide and 35 mm long are punched out from a raw protective sheet 20 so that the length of 35 mm in each sample 21 is taken in a widthwise direction 4 of the raw protective sheet 20. After left in a conditioning space under 25±2%RH for 24 hours, each sample 21 is taken out from the conditioning space. Within 2minutes, each sample 21 is put on a flat surface. In the condition that an end of each sample 21 is held by 5 mm, a spatial distance raised from the flat surface is measured. All the five samples 21 are measured in the same manner as described above, so that an average of five measured values is calculated as the amount of curl of the protective sheet.

Figure 4:
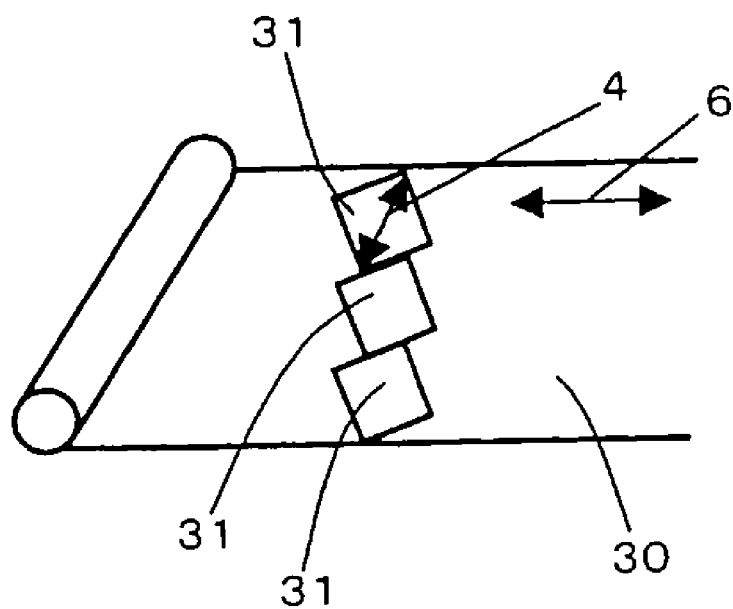
FIG. 4 is a schematic view showing a method for acquiring a curl amount measuring sample from a polarizing plate in the invention.

The amount of curl of the polarizing plate is measured as follows. As shown in FIG. 4, three samples 31 each having a size of 25 cm square are punched out from a raw material sheet 30 of the polarizing plate in a widthwise direction 4 so that an absorption axis 6 of the raw material sheet 30 is inclined at an angle of 45° to each side of each sample 31. Each sample 31 is put on a flat surface. Spatial distances raised from the flat surface are measured at two top points of the sample 31 in the widthwise direction 4. All the three samples 31 are measured in the same manner as described above, so that an average of six measured values is calculated as the amount of curl of the polarizing plate.

The amount of curl of the protective sheet measured as described above is evaluated on the basis of a laminating index L given by the expression:

$$L=(a-b)/a\times 100$$

in which a and b are amounts of curl of two protective sheets respectively on the assumption of a>b.

Although the amount of curl is approximately proportional to the length of the protective sheet, the laminating index L can be decided regardless of the length of the protective sheet. In the invention, the laminating index L is preferably not higher than 60 and more preferably not higher than 40. If the laminating index L is higher than 60, the amount of curl of the polarizing plate increases even in the case where the laminating method according to the invention is used.

The extracting method used at the time of measuring the amount of curl need not be used when the polarizing plate is actually cut out. That is, the polarizing plate can be cut out so that each side of the polarizing plate is inclined at an optional angle of from 0° to 180° with respect to the absorption axis.

In practice, the polarizing plate according to the invention can be used after any kind of optical layer is laminated on the polarizing plate. The optical layer is not particularly limited if it satisfies required optical characteristic. For example, a surface of the transparent protective film to which the polarizer is not bonded (i.e., a surface on which the adhesive layer is not provided) may be subjected to a hard coating treatment, an anti-reflection treatment or a surface treatment for anti-sticking, diffusion or anti-glare. For example, a method of laminating an oriented liquid crystal layer on the surface of the transparent protective film may be used for the purpose of compensating the viewing angle. A layer of an optical film such as a reflecting plate, a semi-transmissive plate, a phase retarder (inclusive of a wave plate (λ plate) such as a half-wave plate or a quarter-wave plate), a viewing angle compensating film, or a luminance-enhancing film used for forming a liquid crystal display device may be used as the optical layer. Or a laminate of two or more layers of such optical films may be used as the optical layer. Especially, there may be preferably used a reflection type or semi-transmission type polarizing plate made of a laminate of the polarizing plate and a reflecting plate or semi-transmissive reflecting plate, an elliptic or circular polarizing plate made of a laminate of the polarizing plate and a phase retarder, a wide viewing angle polarizing plate made of a laminate of the polarizing plate and a viewing angle compensating layer or film, or a luminance-enhancing type polarizing plate made of a laminate of the polarizing plate and a luminance-enhancing film. The optical layer or optical film may be laminated onto the transparent protective film after or before the transparent protective film is bonded to the polarizer.

The hard coating treatment is carried out for preventing a surface of the polarizing plate from being scratched. For example, the hard coating treatment can be achieved by a method in which a cured film excellent in hardness, lubricity, etc. as obtained from a suitable ultraviolet-curable resin such as an acrylic resin or a silicone resin is added to a surface of the transparent protective film. The anti-reflection treatment is carried out for preventing a surface of the polarizing plate from reflecting external light. For example, the anti-reflection treatment can be achieved by a method of forming an anti-reflection film according to the related art. The anti-sticking treatment is carried out for preventing the polarizing plate from being stuck closely to an adjacent layer.

The anti-glare treatment is carried out for preventing visibility of light transmitted through the polarizing plate from being disturbed by external light reflected in a surface of the polarizing plate. For example, the anti-glare treatment can be achieved by a technique in which a fine irregular structure is given to a surface of the transparent protective film by a suitable method such as a surface roughening method using sandblasting or embossing, or a method of mixing transparent fine particles. For example, transparent fine particles with a mean particle size of 0.5 μm to 50 μm can be used as the fine particles contained in the transparent protective film for forming the fine irregular surface structure. Examples of the transparent fine particles include: inorganic fine particles of silica, alumina, titania, zirconia, tinoxide, indiumoxide, cadmium oxide, antimony oxide, etc. which may be electrically conductive; and organic fine particles of a crosslinked or non-crosslinked polymer. When the fine irregular surface structure is formed, the amount of fine particles used is generally in a range of from about 2 parts by weight to about 70 parts by weight, preferably in a range of from 5 parts by weight to 50 parts by weight, with respect to 100 parts by weight of a transparent resin for forming the fine irregular surface structure. The anti-glare layer may serve also as a diffusing layer (having a viewing angle enlarging function, etc.) for diffusing light transmitted through the polarizing plate to enlarge the viewing angle etc.

Incidentally, the optical layer such as an anti-reflection layer, an anti-sticking layer, a diffusing layer or an anti-glare layer may be provided in the transparent protective film per se or may be provided as a matter separate from the transparent protective film.

The process of bonding the polarizer and the transparent protective film to each other is not particularly limited. For example, the bonding process can be carried out through an adhesive agent made of a vinyl polymer or an adhesive agent at least made of an aqueous crosslinking agent of a vinyl alcohol polymer containing boric acid or borax, glutaric aldehyde or melamine, and oxalic acid. The adhesive layer may be formed as a dried layer of an applied aqueous solution. The aqueous solution can be prepared so that other additives and a catalyst such as acid are mixed with the aqueous solution if necessary.

The reflection type polarizing plate is a polarizing plate provided with a reflecting layer. For example, the reflection type polarizing plate is used for forming a liquid crystal display device of the type of performing display by reflecting incident light coming from the viewing side (display side). The reflection type polarizing plate has an advantage in that reduction in thickness and size of the liquid crystal display device can be attained easily because a built-in light source such as a backlight unit can be dispensed with. The reflection type polarizing plate can be formed by a suitable method such as a method of providing a reflecting layer of a metal or the like on a surface of the polarizing plate through a transparent protective layer or the like if necessary.

As a specific example, the reflection type polarizing plate may be formed so that a sheet of foil or a deposited film of a reflective metal such as aluminum is provided on a surface of a matted transparent protective film to thereby form a reflecting layer on the transparent protective film. The reflection type polarizing plate may be also formed so that a reflecting layer having a fine irregular structure is formed on a fine irregular surface structure which is formed in such a manner that fine particles are mixed with the transparent protective film. The reflecting layer having the fine irregular structure has an advantage in that incident light is diffused by irregular reflection to prevent directivity and glaring appearance to thereby suppress ununiformity in brightness and darkness. The transparent protective film containing fine particles also has an advantage in that incident light and reflected light thereof is diffused when transmitted through the transparent protective film to thereby suppress ununiformity in brightness and darkness more perfectly. The reflecting layer having the fine irregular structure corresponding to the fine irregular surface structure of the transparent protective film can be formed by a technique in which a metal is directly provided on a surface of the transparent protective film by a suitable vapor deposition or plating method such as a vacuum vapor deposition method, an ion plating method or a sputtering method.

In place of direct provision of the reflecting plate on the transparent protective film of the polarizing plate, the reflecting plate may be used as a reflecting sheet constituted by a suitable film according to the transparent film and a reflecting layer provided on the suitable film. Incidentally, the reflecting layer is generally made of a metal. Accordingly, the reflecting surface of the reflecting layer may be preferably coated with a transparent protective film or a polarizing plate from the point of view of preventing lowering of reflectance due to oxidation and, accordingly, long duration of initial reflectance and avoidance of separate provision of a protective layer.

Incidentally, the semi-transmission type polarizing plate can be obtained in such a manner that the aforementioned reflecting layer is provided as a semi-transmission type reflecting layer such as a half mirror capable of reflecting part of light and transmitting the other part of light. The semi-transmission type polarizing plate is generally provided on the rear side of a liquid crystal cell to thereby make it possible to form a liquid crystal display device of the type in which image display is performed on the basis of reflection of incident light given from the viewing side (display side) when the liquid crystal display device is used in a relatively bright environment and in which image display is performed by using a built-in light source such as a backlight unit provided in the back side of the semi-transmission type polarizing plate when the liquid crystal display device is used in a relatively dark environment. That is, the semi-transmission type polarizing plate is useful for the formation of a liquid crystal display device of the type which can be used in a bright environment while energy consumed by a light source such as a backlight unit is saved and which can be also used in a relatively dark environment by using the built-in light source.

The elliptically or circularly polarizing plate as a laminate of the polarizing plate and a phase retarder will be described below. The phase retarder is used for converting linearly polarized light into elliptically or circularly polarized light, converting elliptically or circularly polarized light into linearly polarized light or changing the direction of polarization of linearly polarized light. Particularly as the phase retarder for converting linearly polarized light into elliptically or circularly polarized light or converting elliptically or circularly polarized light into linearly polarized light, there is used a so-called quarter-wave plate (also referred to as $\lambda/4$ plate). A half-wave plate (also referred to as $\lambda/2$ plate) is generally used for changing the direction of polarization of linearly polarized light.

The elliptically polarizing plate is used effectively for compensating for (preventing) coloring (blue or yellow) caused by birefringence of a liquid crystal layer of a super-twisted nematic (STN) liquid crystal display device to achieve monochrome display free from the coloring. An elliptically polarizing plate of the type capable of controlling three-dimensional refractive indices can be preferably used because coloring generated at the time of obliquely viewing a screen of a liquid crystal display device can be compensated for (prevented). The circularly polarizing plate is used effectively for adjusting the color tone of an image on a reflection type liquid crystal display device, for example, for color image display. The circularly polarizing plate also has an anti-reflection function.

Examples of the phase retarder include: a birefringent film of a uniaxially or biaxially stretched high-molecular material; an oriented film of a liquid crystal polymer; and a film provided with an oriented layer of a liquid crystal polymer supported by the film. For example, the process of stretching the high-molecular material can be carried out by a roll stretching method, a long gap alignment stretching method, a tenter stretching method, a tubular stretching method, etc. The stretching scale is generally in a range of from about 1.1 times to about 3 times in the case of uniaxial stretching. The thickness of the phase retarder is not particularly limited either. Generally, the thickness of the phase retarder is in a range of from 10 μm to 200 μm, preferably in a range of from 20 μm to 100 μm.

Examples of the high-molecular material include: high-molecular substances such as polyvinyl alcohol, polyvinyl butyral, polymethyl vinyl ether, polyhydroxyethyl acrylate, hydroxyethyl cellulose, hydroxypropyl cellulose, methyl cellulose, polycarbonate, polyallylate, polysulfone, polyethylene terephthalate, polyethylene naphthalate, polyethersulfone, polyphenylene sulfide, polyphenylene oxide, polyallyl sulfone, polyvinyl alcohol, polyamide, polyimide, polyolefin, polyvinyl chloride, and cellulose polymer; and various kinds of co-orter-polymers, graft copolymers and blends of these high-molecular substances. The high-molecular material forms an oriented matter (stretched film) when stretched.

Examples of the liquid crystal polymer include various kinds of main-chain or side-chain polymers having conjugate linear atom groups (mesogen groups) introduced into its main chain or side chain for donating liquid crystal orienting characteristic. Specific examples of the main-chain liquid crystal polymer include polymers each having such a structure that mesogen groups are connected by a spacer portion for donating flexing characteristic, that is, a nematic liquid crystal polyester polymer, a discotic polymer, and a cholesteric polymer. Specific examples of the side-chain liquid crystal polymer include polymers each of which has polysiloxane, polyacrylate, polymethacrylate or polymalonate as a main chain skeleton, and a mesogen portion of a nematic orientation-donating para-substitutional cyclic compound unit through a spacer portion of conjugate atom groups as a side chain. Each of these liquid crystal polymers can be produced, for example, by a method in which a liquid crystal polymer solution is spread on a rubbed surface of a thin film of polyimide, polyvinyl alcohol or the like formed on a glass plate or on an oriented surface of obliquely deposited silicon oxide and then heated.

The phase retarder can have a suitable retardation according to the purpose of use such as the purpose of compensating for coloring caused by the birefringence of various kinds of wave plates and liquid crystal layers, the viewing angle, and so on. The phase retarder may be made of a laminate of at least two kinds of phase retarders in order to control optical characteristic such as retardation.

The elliptically polarizing plate or the reflection type elliptically polarizing plate is provided as a laminate using a suitable combination of at least one polarizing plate or reflection type polarizing plate and at least one phase retarder. The (reflection type) elliptically polarizing plate may be formed in such a manner that at least one (reflection type) polarizing plate and at least one phase retarder are laminated and stuck successively and separately in the process of production of a liquid crystal display device. Or the (reflection type) elliptically polarizing plate may be provided as an optical film in advance. The (reflection type) elliptically polarizing plate provided as an optical film is excellent in stability of quality and efficiency in laminating work, so that there is an advantage in that efficiency in production of a liquid crystal display or the like can be improved.

The viewing angle compensating film is a film provided for widening the viewing angle so that an image can be seen relatively sharply even in the case where a screen of a liquid crystal display device is viewed not perpendicularly but slightly obliquely. Examples of the viewing angle compensating phase retarder include: a phase retarder; an oriented film of a liquid crystal polymer etc.; and a transparent substrate having an oriented layer of a liquid crystal polymer etc. supported thereon. Although the general phase retarder is made of a polymer film uniaxially stretched in an in-plane direction so as to have birefringence, the phase retarder used as the viewing angle compensating film is made of a polymer film biaxially stretched in an in-plane direction so as to have birefringence or a bidirectionally stretched film such as a polymer film or a gradient oriented film uniaxially stretched in an in-plane direction and further stretched in a direction of thickness so as to have birefringence with the refractive index controlled in the direction of thickness. Examples of the gradient oriented film include: a polymer film stretched and/or shrunk under action of shrinking force of a heat-shrinkable film due to heating after the heat-shrinkable film is bonded to the polymer film; and a film of a liquid crystal polymer oriented obliquely. Polymers listed above in the description of the phase retarder can be used as materials for forming the phase retarder used as the viewing angle compensating film. A suitable polymer can be selected and used from the point of view of prevention of coloring caused by on the retardation in a liquid crystal cell according to change in viewing angle and enlargement of the viewing angle with good visibility.

To achieve a wide viewing angle with good visibility, there can be preferably used an optically compensating phase retarder which is formed in such a manner that an optically anisotropic layer made of an oriented layer of a liquid crystal polymer, especially made of an obliquely oriented film of a discotic liquid crystal polymer, is supported by a triacetyl cellulose film.

The polarizing plate provided as a laminate of a polarizing plate and a luminance-enhancing film is generally used in a state in which it is provided on the rear side of a liquid crystal cell. The luminance-enhancing film exhibits characteristic of reflecting part of light such as linearly polarized light having a predetermined axis of polarization or circularly polarized light having a predetermined direction but transmitting the other part of light when natural light is incident on the luminance-enhancing film from a backlight unit of a liquid crystal display device or by reflection in the rear side. The polarizing plate provided as a laminate of a polarizing plate and a luminance-enhancing film is provided so that part of light having a predetermined polarized state is transmitted and the other part of light not having the predetermined polarized state is not transmitted but reflected when light emitted from a light source such as a backlight unit is incident on the polarizing plate. Light reflected by a surface of the luminance-enhancing film may be returned by a reflection layer provided on the rear side of the luminance-enhancing film so that the light can be made incident on the luminance-enhancing film again. As a result, the light can be partially or wholly transmitted as light having the predetermined polarized state to attain increase in the amount of light transmitted through the luminance-enhancing film. Moreover, polarized light difficult to be absorbed to the polarizer can be supplied to attain increase in the amount of light allowed to be used for liquid crystal image display. In this manner, luminance can be improved. That is, if light emitted from a backlight unit on the rear side of a liquid crystal cell is made incident on the polarizer without use of any luminance-enhancing film, the light can be little transmitted through the polarizer because a large part of light having a direction of polarization not coincident with the axis of polarization of the polarizer is absorbed to the polarizer. That is, though the amount of light transmitted varies according to the characteristic of the polarizer used, about 50% of light is generally absorbed to the polarizer to decrease the amount of light allowed to be used for liquid crystal image display to thereby darken an image. The luminance-enhancing film does not transmit light having a direction of polarization which will be absorbed to the polarizer, that is, the luminance-enhancing film once reflects such light. The reflected light is returned by a reflecting layer provided on the rear side of the luminance-enhancing film so that the light can be made incident on the luminance-enhancing film again. While this operation is repeated, the direction of polarization of light reflected and returned between the luminance-enhancing film and the reflecting layer can be changed to allow the light to be transmitted through the polarizer. Only polarized light having the direction of polarization changed in this manner is supplied to the polarizer. Accordingly, light emitted from a backlight unit or the like can be effectively used for image display on a liquid crystal display device, so that the screen of the liquid crystal display device can be made bright.

A diffusing plate may be provided between the luminance-enhancing film and the reflecting layer. Light of a polarized state reflected by the luminance-enhancing film advances toward the reflecting layer. The diffusing plate provided between the luminance-enhancing film and the reflecting layer diffuses light transmitted through the diffusing plate evenly while eliminating the polarized state to a non-polarized state. That is, the polarized state is restored to a natural light state. The light of the non-polarized state, that is, the natural light state advances toward the reflecting layer and is reflected by the reflecting layer. The reflected light is transmitted through the diffusing plate again, so that the light is made incident on the luminance-enhancing film again. This operation is repeated. When the diffusing plate for restoring the polarized state to its original natural light state is provided as described above, a screen of uniform brightness can be provided so that ununiformity of brightness of the display screen can be reduced while brightness of the display screen can be retained. It is conceived that a display screen of uniform brightness can be provided because of moderate increase in the number of repetitions in reflection of initial incident light in addition to the diffusing function of the diffusing plate when the diffusing plate for restoring the polarized state to its original natural light state is provided.

Examples of the luminance-enhancing film that can be used suitably include: a film exhibiting characteristic of transmitting linearly polarized light having a predetermined axis of polarization but reflecting the other part of light, such as a multi-layer dielectric thin film or a multi-layer thin film having layers different in refractive index anisotropy; and a film exhibiting characteristic of reflecting either left-handed circularly polarized light or right-handed circularly polarized light but transmitting the other part of light, such as an oriented film of a cholesteric liquid crystal polymer or a film substrate having an oriented liquid crystal layer of a cholesteric liquid crystal polymer supported thereon.

Accordingly, when light transmitted through a luminance-enhancing film of the type of transmitting linearly polarized light having a predetermined axis of polarization is made incident on the polarizing plate having its axis of polarization coincident with the predetermined axis polarization, the light can be efficiently transmitted through the polarizing plate while absorption loss due to the polarizing plate is suppressed. On the other hand, in a luminance-enhancing film of the type of transmitting circularly polarized light in the same manner as in a cholesteric liquid crystal layer, although light can be made incident on the polarizer as it is, it is preferable from the point of view of suppression of absorption loss that the circularly polarized light is converted into linearly polarized light by a phase retarder so that the linearly polarized light can be made incident on the polarizing plate. Incidentally, when a quarter-wave plate is used as the phase retarder, circularly polarized light can be converted into linearly polarized light.

A phase retarder functioning as a quarter-wave plate in a wide wavelength range such as a visible light wavelength range can be obtained, for example, by a method of laminating a retardation layer functioning as a quarter-wave plate for monochromatic light with a wavelength of 550 nm and a retardation layer exhibiting another retardation characteristic such as a retardation layer functioning as a half-wave plate. Therefore, the phase retarder disposed between the polarizing plate and the luminance-enhancing film may contain one retardation layer or two or more retardation layers.

Incidentally, when the cholesteric liquid crystal layer is formed as an arrangement structure in which two layers or three or more layers different in reflection wavelength are laminated in combination, the cholesteric liquid crystal layer can be obtained as a layer reflecting circularly polarized light in a wide wavelength range such as a visible light wavelength range. As a result, circularly polarized light transmitted through the cholesteric liquid crystal in a wide wavelength range can be obtained.

In the invention, the polarizing plate may be formed as a laminate of a polarizing plate and two or three or more optical layers in the same manner as in the polarized light separating type polarizing plate. Therefore, the polarizing plate may be a reflection type elliptically polarizing plate or semi-transmission type elliptically polarizing plate formed by combination of the reflection type polarizing plate or semi-transmission type polarizing plate and the phase retarder.

Although an optical film, which is a laminate of the polarizing plate and the optical layers, can be also formed by a method of laminating the optical layers successively and separately in the process of production of a liquid crystal display device or the like, an optical film formed by lamination in advance is excellent in stability of quality, efficiency in assembling work, and so on, and brings an advantage in that the process of production of a liquid crystal display device or the like can be improved. Suitable bonding means such as a pressure-sensitive adhesive layer can be used for lamination. When the polarizing plate and another optical layer are bonded to each other, the optical axes thereof can be disposed to form a suitable angle in accordance with aimed retardation characteristic.

A pressure-sensitive adhesive layer can be provided on the polarizing plate or laminated optical member in the invention so that the polarizing plate or laminated optical member can be bonded to another member such as a liquid crystal cell by the pressure-sensitive adhesive layer. The pressure-sensitive adhesive layer is not particularly limited. For example, the pressure-sensitive adhesive layer can be made of a suitable pressure-sensitive adhesive agent such as an acrylic resin according to the related art. From the point of view of prevention of a foaming phenomenon and a peeling phenomenon due to moisture absorption, prevention of lowering of optical characteristic and warping of a liquid crystal cell due to difference between thermal expansion coefficients, and hence formability of an image display device high in quality and excellent in durability, it is preferable that the pressure-sensitive adhesive layer is low in coefficient of moisture absorption and excellent in heat resistance. The pressure-sensitive adhesive layer may contain fine particles so as to exhibit light-diffusing characteristic. The pressure-sensitive adhesive layer may be provided on a necessary surface as occasion demands. For example, referring to the polarizing plate composed of a polarizer and at least one protective film in the invention, the pressure-sensitive adhesive layer may be provided on one or each of opposite surfaces of a protective layer as occasion demands.

When the pressure-sensitive adhesive layer is exposed in the surface, the pressure-sensitive adhesive layer may be preferably temporarily covered with a separator for the purpose of preventing contamination until the pressure-sensitive adhesive layer is put into practical use. The separator can be formed by a method in which a releasing coat of a suitable releasing agent such as a silicone releasing agent, a long-chain alkyl releasing agent, a fluorine releasing agent or molybdenum sulfide is provided on a suitable thin film according to the transparent protective film as occasion demands.

Incidentally, each of layers such as a polarizer, a transparent protective film, an optical layer and a pressure-sensitive adhesive layer for forming the polarizing plate and the optical member may be given ultraviolet-absorbing power by a suitable method such as a method of treating the layer with an ultraviolet-absorbing agent such as a salicylic ester compound, a benzophenone compound, a benzotriazole compound, a cyanoacrylate compound or a nickel complex salt compound.

The polarizing plate according to the invention can be preferably used for forming an image display device such as a liquid crystal display device, an organic EL display device or a PDP.

The polarizing plate according to the invention can be preferably used for forming various kinds of devices such as a liquid crystal display device. For example, the polarizing plate can be used in a reflection type, semi-transmission type or transmission-reflection double type liquid crystal display device in which the polarizing plate is disposed on one or each of opposite surfaces of a liquid crystal cell. A substrate for the liquid crystal cell may be a plastic substrate or a glass substrate. The liquid crystal cell used for forming the liquid crystal display device can be selected optionally. For example, there may be used any suitable type of liquid crystal cell such as an active matrix drive type liquid crystal cell represented by a thin-film transistor type liquid crystal cell or a passive matrix drive type liquid crystal cell represented by a twisted nematic liquid crystal cell or a super-twisted nematic liquid crystal cell.

When polarizing plates or optical members are provided on opposite surfaces of the liquid crystal cell respectively, the polarizing plates or optical members may be the same or may be different. For formation of the liquid crystal display device, one or two or more layers of suitable parts such as a prism array sheet, a lens array sheet, a light-diffusing plate and a backlight unit may be disposed in a suitable position or positions.

Next, an organic electroluminescence device (organic EL display device) will be described. Generally, in the organic EL display device, a transparent electrode, an organic emitting layer and a metal electrode are laminated successively on a transparent substrate to thereby form an emitter (organic electroluminescence emitter). The organic emitting layer is provided as a laminate of various organic thin films. For example, there are known configurations of various combinations such as a laminate of a hole injection layer made of a triphenylamine derivative or the like and a luminous layer made of an organic fluorescent solid substance such as anthracene, a laminate of the luminous layer and an electron injection layer made of a perylene derivative or the like, and a laminate of the hole injection layer, the luminous layer and the electron injection layer.

The organic EL display device emits light on the basis of the following principle. When a voltage is applied between the transparent electrode and the metal electrode, holes and electrons are injected into the organic emitting layer. In the organic emitting layer, these holes and electrons are recombined to generate energy for exciting the fluorescent substance. When the excited fluorescent substance is restored to its normal state, light is radiated from the fluorescent substance. The mechanism of hole-electron recombination in the middle of the aforementioned principle is the same as that of a general diode. As expected from this fact, both electric current and luminous efficiency exhibit strong non-linearity resulting from rectifiability with respect to the applied voltage.

In the organic EL display device, at least one electrode must be transparent to take out light emitted from the organic emitting layer. Generally, a transparent electrode made of a transparent electrical conductor such as indium tin oxide (ITO) is used as an anode. On the other hard, it is important that a substance small in work function is used as a cathode to make electron injection easy to improve luminous efficiency. Generally, a metal electrode made of Mg-Ag, Al-Li or the like is used as the cathode.

In the organic EL display device configured as described above, the organic emitting layer is formed as a very thin film about 10 nm thick. Accordingly, like the transparent electrode, the organic emitting layer transmits light approximately perfectly. As a result, light incident on a surface of the transparent substrate, transmitted through both the transparent electrode and the organic emitting layer and reflected by the metal electrode at the time of non-emitting operation comes to the surface side of the transparent substrate again. Accordingly, when viewed from the outside, a display surface of the organic. EL display device looks like a mirror surface.

In an organic EL display device including an organic electroluminescence emitter having an organic emitting layer for emitting light by application of a voltage, a transparent electrode provided on a front surface side of the organic emitting layer, and a metal electrode provided on a rear surface side of the organic emitting layer, a polarizing plate may be provided on the front surface side of the transparent electrode and a retardation film may be provided between the transparent electrode and the polarizing plate.

The retardation film and the polarizing plate have a function of polarizing light which comes from the outside and is reflected by the metal electrode. The polarizing function is effective in preventing the mirror surface of the metal electrode from being visually recognized from the outside. Particularly when the retardation film is constituted by a quarter-wave plate while the angle in direction of polarization of light between the polarizing plate and the phase retarder is adjusted to $\pi/4$, the mirror surface of the metal electrode can be shaded perfectly.

That is, only a linearly polarized light component of external light incident on the organic EL display device is transmitted through the polarizing plate. Generally, the linearly polarized light is converted into elliptically polarized light by the retardation film. Particularly when the retardation film is constituted by a quarter-wave plate while the angle in direction of polarization of light between the polarizing plate and the phase retarder is adjusted to $\pi/4$, the linearly polarized light is converted into circularly polarized light by the retardation film.

The circularly polarized light is transmitted through the transparent substrate, the transparent electrode and the organic thin film and then reflected by the metal electrode. The reflected light is transmitted through the organic thin film, the transparent electrode and the transparent substrate again and converted into linearly polarized light by the retardation film again. The linearly polarized light cannot be transmitted through the polarizing plate because it is perpendicular to the direction of polarization of the polarizing plate. As a result, the mirror surface of the metal electrode can be shaded perfectly.

According to the invention, a polarizing plate little curled and a method for producing the polarizing plate are provided as follows. Directions and amounts of curl of two curled protective sheets are measured before lamination of the two curled protective sheets onto a polarizer. The two curled protective sheets are laminated onto opposite surfaces of the polarizer respectively so that the curling directions of the two curled protective sheets are reverse to each other. In this manner, a polarizing plate little curled is obtained.

The invention will be described below more specifically on the basis of the following Examples and Comparative Examples but the invention is not limited to the Examples and Comparative Examples.

EXAMPLE 1

A polyvinyl alcohol (PVA) film (made by Kuraray Co., Ltd., degree of polymerization: 2400) was stretched to three times in a first bath (aqueous solution containing iodine and KI at 30° C.) and then stretched to six times as a total stretching factor in a second bath (aqueous solution containing boric acid and KI at 55° C.) to thereby obtain a polarizer. Then, two protective sheets (protective sheets a and b) each made of an 80 µm-thick triacetyl cellulose (TAC) film were bonded to opposite surfaces of the polarizer respectively by a PVA adhesive agent so that curling directions of the two protective sheets were reverse to each other as shown in FIG. 1A. Then, the polarizer with the two protective sheets was dried at 50° C. for 5 minutes. Thus, a polarizing plate was produced. The laminating index in this case was 60. As a result, the amount of curl of the polarizing plate after lamination was 8 mm. The curl of the polarizing plate obtained was small.

EXAMPLE 2

A polarizing plate was produced in the same manner as in Example 1 except that two protective sheets having a laminating index of 40 were bonded to opposite surfaces of the polarizer respectively so that curling directions of the two protective sheets were reverse to each other as shown in FIG. 1B. As a result, the amount of curl of the polarizing plate after lamination was 4 mm. The curl of the polarizing plate obtained was small.

EXAMPLE 3

A polarizing plate was produced in the same manner as in Example 1 except that two protective sheets having a laminating index of 30 were bonded to opposite surfaces of the polarizer respectively so that curling directions of the two protective sheets were reverse to each other as shown in FIG. 1A. As a result, the amount of curl of the polarizing plate after lamination was 2 mm. The curl of the polarizing plate obtained was very small.

EXAMPLE 4

A polarizing plate was produced in the same manner as in Example 1 except that two protective sheets having a laminating index of 20 were bonded to opposite surfaces of the polarizer respectively so that curling directions of the two protective sheets were reverse to each other as shown in FIG. 1A. As a result, the amount of curl of the polarizing plate after lamination was 0 mm. The curl of the polarizing plate obtained was zero.

EXAMPLE 5

A polarizing plate was produced in the same manner as in Example 1 except that two protective sheets having a laminating index of 80 were bonded to opposite surfaces of the polarizer respectively so that curling directions of the two protective sheets were reverse to each other as shown in FIG. 1A. As a result, the amount of curl of the polarizing plate after lamination was 14 mm. The curl of the polarizing plate obtained was relatively small.

COMPARATIVE EXAMPLE 1

A polarizing plate was produced in the same manner as in Example 1 except that two protective sheets having a laminating index of 80 were bonded to opposite surfaces of the polarizer respectively so that curling directions of the two protective sheets were equal to each other as shown in FIG. 2A. As a result, the amount of curl of the polarizing plate after lamination was 21 mm. The curl of the polarizing plate obtained was conspicuous.

COMPARATIVE EXAMPLE 2

A polarizing plate was produced in the same manner as in Example 1 except that two protective sheets having a laminating index of 60 were bonded to opposite surfaces of the polarizer respectively so that curling directions of the two protective sheets were equal to each other as shown in FIG. 2A. As a result, the amount of curl of the polarizing plate after lamination was 23 mm. The curl of the polarizing plate obtained was conspicuous.

COMPARATIVE EXAMPLE 3

A polarizing plate was produced in the same manner as in Example 1 except that two protective sheets having a laminating index of 40 were bonded to opposite surfaces of the polarizer respectively so that curling directions of the two protective sheets were equal to each other as shown in FIG. 2A. As a result, the amount of curl of the polarizing plate after lamination was 28 mm. The curl of the polarizing plate obtained was conspicuous.

COMPARATIVE EXAMPLE 4

A polarizing plate was produced in the same manner as in Example 1 except that two protective sheets having a laminating index of 20 were bonded to opposite surfaces of the polarizer respectively so that curling directions of the two protective sheets were equal to each other as shown in FIG. 2B. As a result, the amount of curl of the polarizing plate after lamination was 38 mm. The curl of the polarizing plate obtained was conspicuous.

(Method for Measuring Amount of Curl of Protective Sheet)

The amount of curl of each protective sheet was measured as follows. As shown in FIG. 3, five samples 21 each having a size of 3 mm wide and 35 mm long were punched out from a raw protective sheet 20 so that the length of 35 mm in each sample 21 was taken in a widthwise direction 4 of the raw protective sheet 20. After left in a conditioning space under 25±2%RH for 24 hours, each sample 21 was taken out from the conditioning space. Within 2minutes, each sample 21 was put on a flat surface. In the condition that an end of each sample 21 was held by 5 mm, a spatial distance raised from the flat surface was measured. All the five samples 21 were measured in the same manner as described above, so that an average of five measured values was calculated as the amount of curl of the protective sheet.

(Method for Measuring Amount of Curl of Polarizing plate)

The amount of curl of the polarizing plate was measured as follows. As shown in FIG. 4, three samples 31 each having a size of 25 cm square were punched out from a raw material sheet 30 in a widthwise direction 4 so that an absorption axis 6 of the raw material sheet 30 was inclined at an angle of 45° to each side of each sample 31. Each sample 31 was put on a flat surface. Spatial distances raised from the flat surface were measured at two top points of the sample 31 in the widthwise direction 4. All the three samples 31 were measured in the same manner as described above, so that an average of six measured values was calculated as the amount of curl of the polarizing plate.

TABLE 1

| Condition | Laminating Method | Laminating Index | Amount of Curl of Protective Sheet a [mm] | Amount of Curl of Protective Sheet b [mm] | Amount of Curl of Polarizing plate [mm] and Evaluation | |
|---|---|---|---|---|---|---|
| Example 1 | FIG. 1A | 60 | 1.0 | 0.4 | 8 | ○ |
| Example 2 | FIG. 1B | 40 | 1.0 | 0.6 | 4 | ⊚ |
| Example 3 | FIG. 1A | 30 | 1.0 | 0.7 | 2 | ⊚ |
| Example 4 | FIG. 1A | 20 | 0.5 | 0.4 | 0 | ⊚ |
| Example 5 | FIG. 1A | 80 | 1.0 | 0.2 | 14 | Δ |
| Comparative Example 1 | FIG. 2A | 80 | 1.0 | 0.2 | 21 | X |
| Comparative Example 2 | FIG. 2A | 60 | 1.0 | 0.4 | 23 | X |
| Comparative Example 3 | FIG. 2A | 40 | 1.0 | 0.6 | 28 | X |
| Comparative Example 4 | FIG. 2B | 20 | 1.0 | 0.8 | 38 | X |

(Evaluation of Amount of Curl of Polarizing plate)
X: not smaller than 15 mm
Δ: not smaller than 10 mm and smaller than 15 mm
○: not smaller than 5 mm and smaller than 10 mm
⊚: smaller than 5 mm As is obvious from the results shown in Table 1, the amount of curl of the polarizing plate produced as a laminate by the production method described in any one of Examples 1 to 5 according to the invention is small. It is to be understood that the problem of curl can be solved by the production method according to the invention.

As described above, in the method of producing a polarizing plate according to the invention, curling directions of two protective sheets laminated onto opposite surfaces of a polarizer respectively can be adjusted to suppress the amount of curl of the polarizing plate to thereby improve work efficiency in bonding the polarizing plate to a panel and optical characteristic such as variation in in-plane transmittance. Furthermore, when the laminating index concerned with the amounts of curl of the protective sheets is reduced, a polarizing plate little curled can be obtained. There can be provided a polarizing plate produced by the production method and an image display device using the polarizing plate.

What is claimed is:

1. A method of producing a polarizing plate, comprising the step of laminating a pair of curled protective sheets, said protective sheets having an intrinsic tendency to curl in respective curling directions, onto opposite surfaces of a polarizer respectively so that respective curling directions of said pair of curled protective sheets are reverse to each other, wherein said pair of curled protective sheets have a laminating index L of not higher than 60 when the laminating index L is given by the expression:

$$L=(a-b)/a\times100$$

in which a and b are quantities of curl in said pair of protective sheets respectively on the assumption of a>b.

2. A method of producing a polarizing plate according to claim 1, wherein concave curled surfaces of said pair of protective sheets are opposed to each other.

3. A method of producing a polarizing plate according to claim 1, wherein concave curled surfaces of said pair of protective sheets are opposed to each other.

4. A method of producing a polarizing plate according to claim 1, wherein the laminating index L is not higher than 40.

5. A polarizing plate produced by a method defined in claim 1.

6. A composite polarizing plate comprising a polarizing plate defined in claim 5 and an optical layer laminated on said polarizing plate.

7. An image display device using at least one composite polarizing plate defined in claim 6.

8. An image display device using at least one polarizing plate defined in claim 5.

9. A method of producing a polarizing plate according to claim 1, wherein the protective sheets are adhered to the polarizer through an adhesive layer.

10. A method of producing a polarizing plate according to claim 9, wherein the adhesive is a pressure-sensitive adhesive.

11. A polarizing plate comprising a polarizer, and a pair of protective sheets laminated onto opposite surfaces of said polarizer respectively, wherein each of said protective sheets has an intrinsic tendency to curl, such that curling directions of said pair of protective sheets would be reverse to each other upon separation if said pair of protective sheets were separated from said polarizing plate, wherein said pair of curled protective sheets have a laminating index L of not higher than 60 when the laminating index L is given by the expression:

$$L=(a-b)/a\times100$$

in which a and b are quantities of curl in said pair of protective sheets respectively on the assumption of a>b.

12. A composite polarizing plate comprising a polarizing plate defined in claim 11 and an optical layer laminated on said polarizing plate.

13. An image display device using at least one composite polarizing plate defined in claim 12.

14. An image display device using at least one polarizing plate defined in claim 11.

15. A polarizing plate according to claim 11, wherein the protective sheets are adhered to the polarizer through an adhesive.

16. A polarizing plate according to claim 15, wherein the adhesive is a pressure-sensitive adhesive.

* * * * *